(12) United States Patent
Zhang et al.

(10) Patent No.: US 11,100,819 B2
(45) Date of Patent: Aug. 24, 2021

(54) DISPLAY MODULE, MANUFACTURING METHOD, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zhen Zhang, Beijing (CN); Kangguan Pan, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/759,953

(22) PCT Filed: Jan. 11, 2019

(86) PCT No.: PCT/CN2019/071407
§ 371 (c)(1),
(2) Date: Apr. 28, 2020

(87) PCT Pub. No.: WO2019/233108
PCT Pub. Date: Dec. 12, 2019

(65) Prior Publication Data
US 2020/0265757 A1 Aug. 20, 2020

(30) Foreign Application Priority Data

Jun. 5, 2018 (CN) .......................... 201810570313.9

(51) Int. Cl.
*G09F 9/30* (2006.01)
*G06K 9/00* (2006.01)

(52) U.S. Cl.
CPC ......... *G09F 9/301* (2013.01); *G06K 9/00013* (2013.01)

(58) Field of Classification Search
CPC .. G06K 9/00013; G06K 9/0004; G09F 9/301; G06F 1/1626; G06F 1/1637; G06F 1/203; G06F 1/1684
See application file for complete search history.

(56) References Cited

U.S. PATENT DOCUMENTS

| 2016/0070414 A1 | 3/2016 | Shukla et al. | |
| 2019/0012555 A1* | 1/2019 | Bae | G06K 9/2027 |
| 2019/0196641 A1* | 6/2019 | Ryu | G06F 3/0443 |

(Continued)

FOREIGN PATENT DOCUMENTS

| CN | 104992158 A | 10/2015 |
| CN | 105501123 A | 4/2016 |

(Continued)

*Primary Examiner* — Muhammad N Edun
(74) *Attorney, Agent, or Firm* — The Webb Law Firm

(57) ABSTRACT

The disclosure provides a display module, a manufacturing method, and a display device. The display module includes a display panel, an optical sensor disposed on an opposite side of a light emitting side of the display panel, and a heat dissipation layer disposed between the display panel and the optical sensor, wherein the heat dissipation layer is provided with an array of through holes, through which light passes and reaches an optical identification device in the optical sensor.

17 Claims, 3 Drawing Sheets

(56) References Cited

U.S. PATENT DOCUMENTS

| | | | |
|---|---|---|---|
| 2019/0205593 A1* | 7/2019 | Kim | H01L 51/5237 |
| 2019/0205603 A1* | 7/2019 | Lee | G06K 9/0002 |
| 2020/0342202 A1* | 10/2020 | Bae | G06F 1/3265 |

FOREIGN PATENT DOCUMENTS

| | | | |
|---|---|---|---|
| CN | 106778616 A | 5/2017 | |
| CN | 107247531 A | 10/2017 | |
| CN | 107272262 A | 10/2017 | |
| CN | 107305411 A | 10/2017 | |
| CN | 107358216 A | 11/2017 | |
| CN | 206907046 U | 1/2018 | |
| CN | 107871447 A | 4/2018 | |
| CN | 107958240 A | 4/2018 | |
| CN | 108962025 A | 12/2018 | |
| EP | 3236390 A1 | 10/2017 | |
| EP | 3306526 A2 | 4/2018 | |

* cited by examiner

DISPLAY MODULE, MANUFACTURING METHOD, AND DISPLAY DEVICE

CROSS-REFERENCE TO RELATED APPLICATIONS

This application is the United States national phase of PCT/CN2019/071407 filed Jan. 11, 2019, and claims priority to Chinese Application No. 201810570313.9, filed on Jun. 5, 2018, the disclosures of which are hereby incorporated by reference in their entirety.

TECHNICAL FIELD

The disclosure relates to the technical field of display, in particular to a display module, a manufacturing method, and a display device.

BACKGROUND

In the related art, an optical sensor is disposed under a display panel, and a light shielding layer having through holes is disposed in the display panel, thereby implementing the in-screen fingerprint recognition using the principle of pinhole imaging. A user can realize fingerprint identification by touching the display screen with a finger.

SUMMARY

According to a first aspect of the embodiments of the present disclosure, a display module is provided, including: a display panel; an optical sensor disposed on an opposite side of a light emitting side of the display panel; and a heat dissipation layer disposed between the display panel and the optical sensor, wherein the heat dissipation layer is provided with an array of through holes, through which light passes and reaches an optical identification device in the optical sensor.

In some embodiments, the optical sensor is configured to identify a fingerprint.

In some embodiments, the optical sensor further comprises: an array of lenses disposed on one side of the optical identification device close to the heat dissipation layer, wherein lenses in the array of lenses correspond to through holes in the array of through holes one to one.

In some embodiments, an optical axis of the lens passes through a corresponding through hole.

In some embodiments, the optical axis of the lens coincides with a central axis of the corresponding through hole.

In some embodiments, an aperture of the through hole is from 6 μm to 12 μm.

In some embodiments, a material of the heat dissipation layer comprises a metal material.

In some embodiments, the display panel is a flexible display panel.

According to a second aspect of the embodiments of the present disclosure, there is provided a display device including a display module, the display module comprises: a display panel; an optical sensor disposed on an opposite side of a light emitting side of the display panel; and a heat dissipation layer disposed between the display panel and the optical sensor, wherein the heat dissipation layer is provided with an array of through holes, through which light passes and reaches an optical identification device in the optical sensor.

In some embodiments, the optical sensor further comprises: an array of lenses disposed on one side of the optical identification device close to the heat dissipation layer, wherein lenses in the array of lenses correspond to through holes in the array of through holes one to one.

In some embodiments, an optical axis of the lens passes through a corresponding through hole.

In some embodiments, the optical axis of the lens coincides with a central axis of the corresponding through hole.

In some embodiments, an aperture of the through hole is from 6 μm to 12 μm.

According to a third aspect of the embodiments of the present disclosure, a method for manufacturing a display module is provided, including: disposing a heat dissipation layer on a light emitting side of a display panel; and disposing an optical sensor on one side of the heat dissipation layer away from the display panel, wherein the heat dissipation layer is provided with an array of through holes, through which light passes and reaches an optical identification device in the optical sensor.

In some embodiments, disposing an array of lenses on one side of the optical identification device close to the heat dissipation layer, wherein lenses in the array of lenses correspond to through holes in the array of through holes one to one.

In some embodiments, an optical axis of the lens passes through a corresponding through hole.

In some embodiments, the optical axis of the lens coincides with a central axis of the corresponding through hole.

In some embodiments, an aperture of the through hole is from 6 μm to 12 μm.

In some embodiments, a material of the heat dissipation layer includes a metal material.

In some embodiments, the display panel is a flexible display panel.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which.

It should be understood that the dimensions of the various parts shown in the drawings are not drawn according to the actual proportional relationship. Further, the same or similar reference numerals denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that, unless otherwise specified, the relative arrangement of parts and steps, the composition of materials and values set forth in these embodiments are to be construed as illustrative only and not as limitative.

The use of "including" or "comprising" and the like in this disclosure is intended to mean that the elements preceding the word encompass the elements listed after the word and does not exclude the possibility that other elements may also be encompassed.

All terms (including technical or scientific terms) used herein have the same meaning as understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

The inventors found through research that, in the related art, the optical sensor is in direct contact with the display panel. Under the condition that a user performs a touch operation, an indentation is formed on a contact surface of the display panel, which is in direct contact with the optical sensor. The resulting indentations can affect the performance of the display panel.

Therefore, the present disclosure proposes a scheme for effectively avoiding the generation of the indentation on the surface of the display panel.

Figure 1:
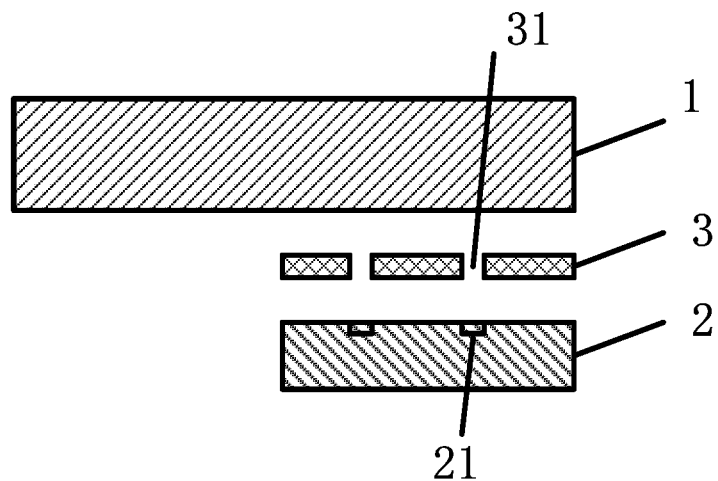
FIG. 1 is a schematic structural diagram of a display module according to one embodiment of the present disclosure.

FIG. 1 is a schematic structural diagram of a display module according to one embodiment of the disclosure.

As shown in FIG. 1, a display module includes a display panel 1, an optical sensor 2, and a heat dissipation layer 3. The optical sensor 2 is disposed on an opposite side of a light emitting side of the display panel 1, and the heat dissipation layer 3 is disposed between the display panel 1 and the optical sensor 2. The heat dissipation layer 3 is provided with an array of through holes. A light pass through corresponding through holes 31 in the array of through holes and reaches an optical identification device 21 in the optical sensor 2.

In some embodiments, an area of the heat dissipation layer 3 may be the same as an area of the display panel 1. In other embodiments, the area of the heat dissipation layer 3 may be smaller than the area of the display panel 1.

In some embodiments, the area of the heat dissipation layer 3 may be the same as an area of the optical sensor 2 to ensure that light passing through the through holes 31 in the heat dissipation layer 3 is effectively accepted by the optical identification device 21 in the optical sensor 2.

In some embodiments, the display panel 1 may be a flexible display panel, or other type of display panel. Because the optical sensor does not be in direct contact with the display panel, the indentation formed on the surface of the display panel is effectively avoided, and the stable work of the display panel is ensured.

In some embodiments, a material of the heat dissipation layer 3 comprises a metal material. By adopting the metal material, heat dissipation can be effectively performed. For example, the heat dissipation layer 3 may be made of a metal material such as copper or aluminum, or a suitable alloy material. In some embodiments, the heat dissipation layer 3 may be made of copper foil.

In the display module provided in the above embodiments of the present disclosure, pinhole imaging is implemented by disposing a heat dissipation layer between the display panel and the optical sensor, and disposing an array of through holes in the heat dissipation layer. Therefore, the optical sensor does not be in direct contact with the display panel, and the indentation formed on the surface of the display panel is effectively avoided. In addition, the heat dissipation layer can also timely dissipate heat energy generated by the display panel and the optical sensor during working, to ensure stable working of the display panel and the optical sensor.

Figure 2:
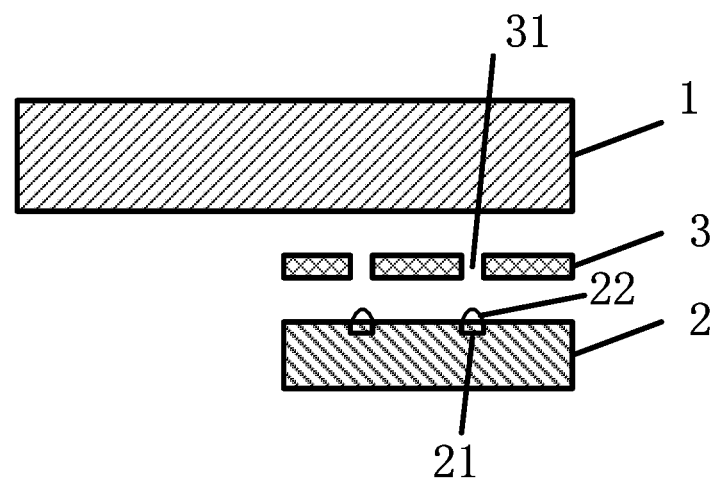
FIG. 2 is a schematic structural diagram of a display module according to another embodiment of the disclosure.

FIG. 2 is a schematic structural diagram of a display module according to another embodiment of the disclosure. FIG. 2 differs from FIG. 1 in that in the embodiment shown in FIG. 2, the optical sensor 2 further comprises an array of lenses for converging light passing through the through hole 31.

As shown in FIG. 2, each lens 22 in the array of lenses is disposed on one side of the optical identification device 2 close to the heat dissipation layer 3. The lenses 22 correspond to the through holes 31 in the array of the through holes one to one. That is, each through hole in the array of through holes corresponds to a unique lens in the array of lenses, and each lens in the array of lenses also corresponds to a unique through hole in the array of through holes.

In some embodiments, an optical axis of the lens 22 passes through a corresponding through hole 31. With the above arrangement, the light passing through the through hole 31 reaches the corresponding lens 22 as much as possible. In other embodiments, the optical axis of the lens 22 coincides with a central axis of the corresponding through hole 31.

Figure 3:
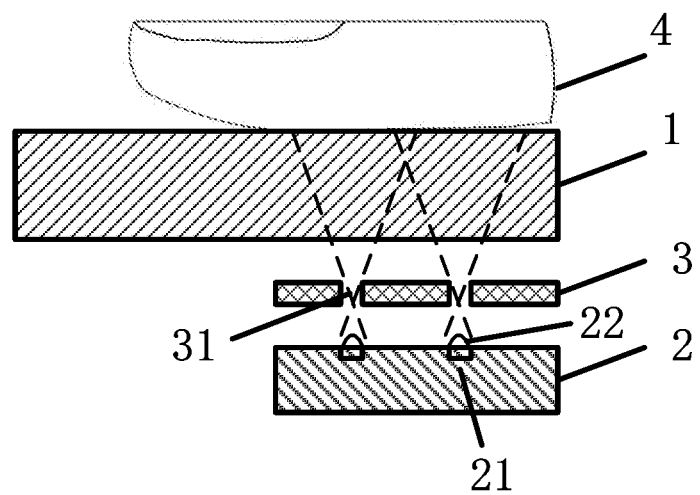
FIG. 3 is a schematic structural diagram illustrating a display module according to still another embodiment of the present disclosure.

FIG. 3 is a schematic structural diagram of a display module according to still another embodiment of the disclosure.

As shown in FIG. 3, the user presses a finger 4 against the surface of the display panel 1, and the corresponding light passes through the through hole 31 and then reaches the optical identification device 21 through the corresponding lens 22. The optical sensor 2 obtains fingerprint information of the user's finger 4 by summarizing the fingerprint images formed by the optical identification devices.

Since the optical sensor can recognize a fingerprint, fingerprint recognition can be achieved by the user touching the display panel.

Figure 4:
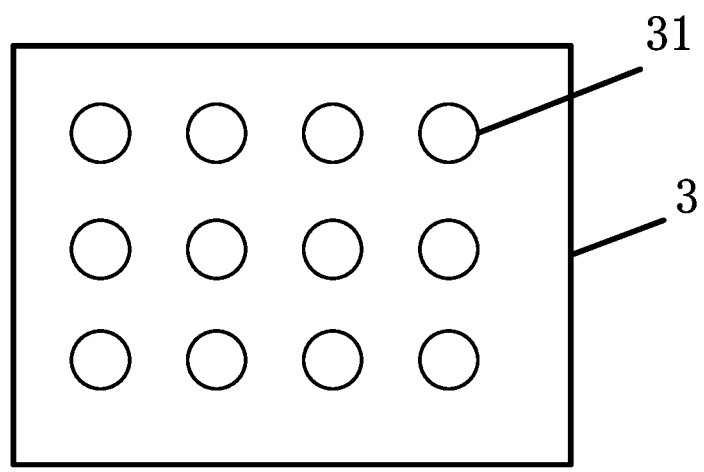
FIG. 4 is a schematic structural diagram of a heat dissipation layer according to one embodiment of the present disclosure.

FIG. 4 is a schematic structural diagram of a heat spreading layer according to one embodiment of the present disclosure.

As shown in FIG. 4, an array of through holes is disposed on the heat dissipation layer 3. In some embodiments, an aperture of the through hole 31 is from 6 μm to 12 μm, to ensure that light can pass through the through hole 31 and also avoid external interference. For example, the aperture of the through hole 31 may be set to 6.5 μm.

In some embodiments, the shape of the through hole 31 may be circular, square, or other shape that facilitates pinhole imaging.

The embodiment of the disclosure also provides a display device which comprises any one of the display modules. The display device may be: any product or component with a Display function, such as an LCD (Liquid Crystal Display), an LED (Light Emitting Diode) Display, an OLED (Organic Light Emitting Diode) Display, a mobile phone, a tablet computer, a television, a notebook computer, a digital photo frame, and a navigator.

In the display device, the optical sensor is not in direct contact with the display panel, the indentation formed on the surface of the display panel is effectively avoided. In addition, the heat dissipation layer can also timely dissipate heat energy generated by the display panel and the optical sensor during working, to ensure stable working of the display panel and the optical sensor.

Figure 5:
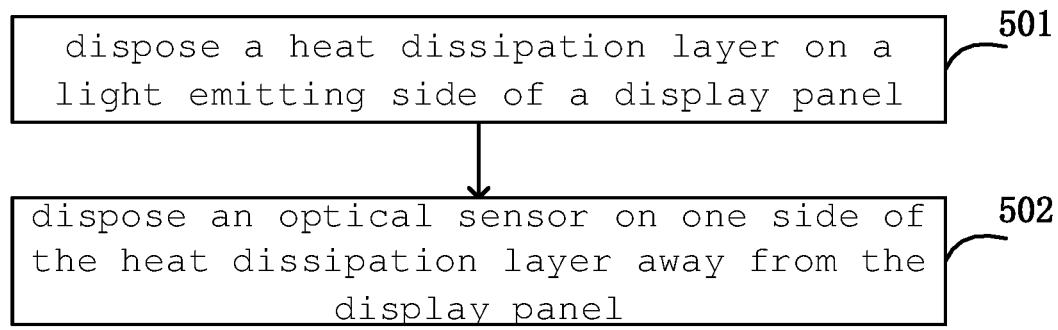
FIG. 5 is a schematic flow chart diagram illustrating a manufacturing method of a display module according to one embodiment of the present disclosure.

FIG. 5 is a schematic flow chart diagram of a manufacturing method of a display module according to one embodiment of the disclosure.

In step 501, a heat dissipation layer is disposed on a light emitting side of a display panel.

In some embodiments, the display panel is a flexible display panel.

In some embodiments, the heat dissipation layer with an array of through holes is obtained by patterning the heat dissipation material layer.

In some embodiments, a material of the heat dissipation layer includes a metal material, and heat dissipation can be effectively performed. For example, the heat dissipation layer may be made of a metal material such as copper or aluminum, or a suitable alloy material. In some embodiments, the heat dissipation layer may be made of copper foil.

In some embodiments, an aperture of the through hole in the array of through holes is from 6 μm to 12 μm to ensure that light can pass through the through holes in the array of through holes and also avoid external interference. For example, the aperture of the through hole may be set to 6.5 μm.

In some embodiments, the shape of the through holes in the array of through holes may be circular, square, or other shape that facilitates pinhole imaging.

In step 502, an optical sensor is disposed on one side of the heat dissipation layer away from the display panel.

Due to the fact that the heat dissipation layer is provided with an array of through holes, through which light passes and reaches the optical identification device in the optical sensor.

In some embodiments, the optical sensor is configured to identify a fingerprint. Therefore, fingerprint recognition can be achieved by the user touching the display panel.

In some embodiments, an array of lenses is disposed on one side of the optical identification device close to the heat dissipation layer. Lenses in the array of lenses correspond to the through holes in the array of through holes one to one. In some embodiments, an optical axis of the lens passes through a corresponding through hole. With the above arrangement, the light passing through the through hole can reaches the corresponding lens as much as possible. For example, the optical axis of the lens coincides with the central axis of the corresponding through hole.

In the manufacturing method of a display module provided by the above embodiment of the present disclosure, pinhole imaging is implemented by disposing a heat dissipation layer between the display panel and the optical sensor, and disposing an array of through holes in the heat dissipation layer. Therefore, the optical sensor does not be in direct contact with the display panel, and the indentation formed on the surface of the display panel is effectively avoided. In addition, the heat dissipation layer can also timely dissipate heat energy generated by the display panel and the optical sensor during working, to ensure stable working of the display panel and the optical sensor.

In some embodiments, the display panel, the heat dissipation layer and the optical sensor are pressed to obtain a display module product.

Figure 6:
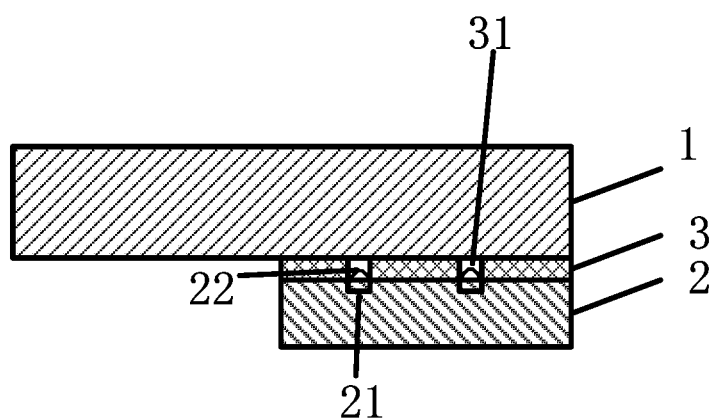
FIG. 6 is a schematic structural diagram of a display module product according to an embodiment of the disclosure.

FIG. 6 is a schematic structural diagram of a display module product according to one embodiment of the disclosure.

As shown in FIG. 6, the display module includes a display panel 1, an optical sensor 2, and a heat dissipation layer 3. The heat dissipation layer 3 is disposed on the light emitting side of the display panel 1, and the optical sensor 2 is disposed on one side of the heat dissipation layer 3 away from the display panel 1. The heat dissipation layer 3 is provided with an array of through holes. A light pass through the through holes 31 in the array of through holes and reaches the optical identification device 21 in the optical sensor 2.

So far, embodiments of the present disclosure have been described in detail. Some details well known in the art have not been described in order to avoid obscuring the concepts of the present disclosure. Those skilled in the art can now fully appreciate how to implement the teachings disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A display module, comprising:
    a display panel;
    an optical sensor disposed on an opposite side of a light emitting side of the display panel; and
    a heat dissipation layer disposed between the display panel and the optical sensor, wherein the heat dissipation layer is provided with an array of through holes, through which light passes and reaches an optical identification device in the optical sensor, and an aperture of the through hole is from 6 μm and 12 μm.

2. The display module of claim 1, wherein the optical sensor is configured to identify a fingerprint.

3. The display module of claim 1, wherein the optical sensor further comprises:
    an array of lenses disposed on one side of the optical identification device close to the heat dissipation layer, wherein lenses in the array of lenses correspond to through holes in the array of through holes one to one.

4. The display module of claim 3, wherein an optical axis of the lens passes through a corresponding through hole.

5. The display module of claim 4, wherein the optical axis of the lens coincides with a central axis of the corresponding through hole.

6. The display module of claim 1, wherein a material of the heat dissipation layer comprises a metal material.

7. The display module of claim 1, wherein the display panel is a flexible display panel.

8. A display device, comprising a display module, the display module comprises:

a display panel;

an optical sensor disposed on an opposite side of a light emitting side of the display panel; and a heat dissipation layer disposed between the display panel and the optical sensor, wherein the heat dissipation layer is provided with an array of through holes, through which light passes and reaches an optical identification device in the optical sensor, and an aperture of the through hole is from 6 µm and 12 µm.

9. The display device of claim 8, wherein the optical sensor further comprises:

an array of lenses disposed on one side of the optical identification device close to the heat dissipation layer, wherein lenses in the array of lenses correspond to through holes in the array of through holes one to one.

10. The display device of claim 9, wherein an optical axis of the lens passes through a corresponding through hole.

11. The display device of claim 10, wherein the optical axis of the lens coincides with a central axis of the corresponding through hole.

12. A manufacturing method of a display module, comprising:

disposing a heat dissipation layer on a light emitting side of a display panel; and disposing an optical sensor on one side of the heat dissipation layer away from the display panel, wherein the heat dissipation layer is provided with an array of through holes, through which light passes and reaches an optical identification device in the optical sensor, and an aperture of the through hole is from 6 µm and 12 µm.

13. The manufacturing method according to claim 12, further comprising:

disposing an array of lenses on one side of the optical identification device close to the heat dissipation layer, wherein lenses in the array of lenses correspond to through holes in the array of through holes one to one.

14. The manufacturing method of claim 13, wherein an optical axis of the lens passes through a corresponding through hole.

15. The manufacturing method according to claim 14, wherein the optical axis of the lens coincides with a central axis of the corresponding through hole.

16. The manufacturing method according to claim 12, wherein a material of the heat dissipation layer includes a metal material.

17. The manufacturing method according to claim 12, wherein the display panel is a flexible display panel.

* * * * *

UNITED STATES PATENT AND TRADEMARK OFFICE
CERTIFICATE OF CORRECTION

Page 1 of 1

PATENT NO. : 11,100,819 B2
APPLICATION NO. : 16/759953
DATED : August 24, 2021
INVENTOR(S) : Zhen Zhang et al.

It is certified that error appears in the above-identified patent and that said Letters Patent is hereby corrected as shown below:

In the Claims

Column 6, Line 54, Claim 1, delete "and" and insert -- to --

Column 7, Line 16, Claim 8, delete "and" and insert -- to --

Column 8, Line 10, Claim 12, delete "µm and" and insert -- µm to --

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*